(12) United States Patent
Huang

(10) Patent No.: US 11,364,597 B2
(45) Date of Patent: Jun. 21, 2022

(54) TIRE CENTERING FIXTURE

(71) Applicant: Jian Huang, Beijing (CN)

(72) Inventor: Jian Huang, Beijing (CN)

( * ) Notice: Subject to any disclaimer, the term of this patent is extended or adjusted under 35 U.S.C. 154(b) by 0 days.

(21) Appl. No.: 17/342,528

(22) Filed: Jun. 8, 2021

(65) Prior Publication Data

US 2021/0291322 A1    Sep. 23, 2021

Related U.S. Application Data

(63) Continuation-in-part of application No. PCT/CN2019/000229, filed on Nov. 27, 2019.

(30) Foreign Application Priority Data

Dec. 11, 2018    (CN) .......................... 201811502530.0

(51) Int. Cl.
| | |
|---|---|
| *B25B 11/00* | (2006.01) |
| *B25B 5/02* | (2006.01) |
| *B25B 5/14* | (2006.01) |
| *G01B 21/26* | (2006.01) |

(52) U.S. Cl.
CPC ............ *B25B 11/00* (2013.01); *B25B 5/02* (2013.01); *B25B 5/14* (2013.01); *G01B 21/26* (2013.01); *G01B 2210/16* (2013.01)

(58) Field of Classification Search
CPC ......... B60B 30/00; B60B 30/02; B60B 30/04; B60B 30/06; B60B 30/08; B25B 11/00; B25B 5/02; B25B 5/14; B60C 25/132; B60C 25/135; B60C 25/053; B60C 25/0521; B60C 25/0539; B60C 25/0542; B60C 25/0545; B60C 25/00; B60C 25/05; B60C 25/527; B25H 1/0007; G01B 21/26; G01B 2210/16
USPC ............................................................ 157/14
See application file for complete search history.

(56) References Cited

U.S. PATENT DOCUMENTS

| | | | | |
|---|---|---|---|---|
| 2006/0243394 | A1* | 11/2006 | Nemish | B60C 25/135 157/14 |
| 2011/0290428 | A1* | 12/2011 | Roussel | B60B 30/06 157/1.22 |

FOREIGN PATENT DOCUMENTS

| | | | |
|---|---|---|---|
| CN | 104908055 B | * | 8/2016 |
| DE | 3529273 A1 | * | 2/1987 |

* cited by examiner

*Primary Examiner* — Robert J Scruggs
(74) *Attorney, Agent, or Firm* — Matthias Scholl P.C.; Matthias Scholl

(57) ABSTRACT

The disclosure provides a tire centering fixture including: a gear, a first rack, a second rack, a third rack, a shaft sleeve, and a guide cylinder. The first rack, the second rack, and the third rack are engaged with the gear. The gear is disposed around the shaft sleeve; the gear and the shaft sleeve are disposed on the guide cylinder. The guide cylinder includes a central cavity and a base wall. The base wall includes a central hole and a circular recess; a lower end of the shaft sleeve is in movable fit with the circular recess of the base wall, and a lower end face thereof is flush with the bottom surface of the circular recess. A locating base is disposed on the upper end face of the guide cylinder and is fixed on the guide cylinder. The locating base functions as an end cover.

5 Claims, 14 Drawing Sheets

TIRE CENTERING FIXTURE

CROSS-REFERENCE TO RELAYED APPLICATIONS

This application is a continuation-in-part of International Patent Application No. PCT/CN2019/000229 with an international filing date of Nov. 27, 2019, designating the United States, now pending, and further claims foreign priority benefits to Chinese Patent Application No. 201811502530.0 filed Dec. 11, 2018. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to a tire centering fixture.

Conventionally, a tire centering fixture is of lead screw type or connection rod type. The stretching of the clamping claws of both types is slow.

SUMMARY

The disclosure provides a tire centering fixture featuring the following characteristics:

1. The transmission of the tire centering fixture comprises a gear and a plurality of racks, and the clamping claw expands and contracts quickly.

2. The telescopic stroke of the clamping claws is reversible, which can be turned by a wrench or directly pushed and pulled by hand.

3. The stretching and retraction lengths of the three clamping claws are equal, thus keeping the tire centering fixture in the center position.

In one embodiment, the tire centering fixture comprises a gear and three racks engaged with the gear. The gear is disposed in a guide cylinder. The guide cylinder comprises a central cavity and a base wall; the base wall comprises a central hole and a circular recess; the gear is disposed around a shaft sleeve; a lower end of the shaft sleeve is in movable fit with the circular recess of the base wall, and a lower end face thereof is flush with a bottom surface of the circular recess. A locating base is disposed on an upper end face of the guide cylinder and is fixed on the guide cylinder; the locating base functions as an end cover; the locating base comprises a central through hole and the shaft sleeve is rotatably disposed in the central through hole; the shaft sleeve and the gear are rotatable in the guide cylinder; in a cross-section direction of the shaft sleeve, an included angle between every two adjacent racks is 110 degrees; in a longitudinal section direction of the gear, the first rack, the second rack, and the third rack are disposed at intervals; a peripheral wall of the guide cylinder comprises three square through holes, and the first rack, the second rack, and the third rack are disposed through the three square through holes, respectively; each rack is movable in a corresponding square through hole; the three square through holes are slide rails of the first rack, the second rack, and the third rack, respectively; the three square through holes are configured to ensure the engagement of the first rack, the second rack, and the third rack with the gear in a radial direction of the gear, with constant gaps therebetween, and to ensure a constant gap between each of the first rack, the second rack, and the third rack and the gear in an axial direction; the first rack, the second rack, and the third rack are movable along a tangential direction of the gear.

To keep the relative position of the gear and the racks in the static state, the tire centering fixture is equipped with a self-locking mechanism. The shaft sleeve is equipped with a ratchet. The self-locking mechanism is configured to fix the ratchet. The locating base is provided with a locating mechanism. The locating mechanism comprises the reset spring, and in the free state, the pin rod is in an extended state. The front end of the pin rod comprises an inclined plane, which is configured to limit the ratchet to rotate one way. That is, when the first clamping claw, the second clamping claw, and the third clamping claw move to tighten the tire, the ratchet is rotatable; when the first clamping claw, the second clamping claw, and the third clamping claw move to loosen the tire, the ratchet is stuck by the pin rod and not rotatable. To make the ratchet rotate reversely, the pin rod must retract out of the stuck state. The self-locking mechanism of the ratchet can also be used in other fixtures.

To control the stretching and contraction of the pin rod, the tire centering fixture is equipped with a cylindrical lifting mechanism. The cylindrical lifting mechanism comprises a pull rod, a cylindrical convex cam, and a cylindrical concave cam. The pull rod is connected to the pin rod. The cylindrical convex cam and the cylindrical concave cam are disposed around the pull rod. The cylindrical concave cam comprises a concave slope having a few of rotating angles, and the cylindrical convex cam comprises a convex slope corresponding to the concave slope. The cylindrical convex cam is fixed in a support base. When the cylindrical convex cam rotates with the pull rod as the axis along the concave slope of the concave cam, an axial displacement occurs to the cylindrical convex cam, thus driving the pull rod and the bolt cap to move axially. A spring is disposed between one end of the cylindrical concave cam and the step of the pull rod. When the cylindrical convex cam rotates in the opposite direction, the cylindrical convex cam returns axially under the action of the spring. The outer circumference of the cylindrical convex cam is welded with a wrench. Optionally, the cylindrical lifting mechanism is a ball point pen type telescopic mechanism or the left and right limit position of the wrench plus the tension spring.

The pull rod is connected to the pin rod via a hinge pin. A round hole is disposed at the lower end of the pull rod, and the hinge pin on the pin rod is disposed in the round hole. The length of the pull rod ensures the cylindrical convex cam and the cylindrical concave cam move to the vicinity of the handle.

The center of the tire centering fixture comprises a shaft support for receiving a reflector base. The shaft support is in transition fit with the center hole of the bottom end of the guide cylinder, and the bottom plate of the shaft support is matched with the bottom surface of the guide cylinder and fixed with the screw. The shaft support passes through the middle of the shaft sleeve and is concentric with the shaft sleeve with clearance fit, so that the rotation of the shaft sleeve does not affect the shaft support.

The upper end of the shaft sleeve is in the shape of a regular hexagon, which is dynamically matched with the hexagon wrench. The hexagon wrench rotates to drive the shaft sleeve and the gear, so that the first rack, the second rack, and the third rack which are engaged with the gear move synchronously.

The guide cylinder comprises three end faces. In the cross-section direction of the guide cylinder, the included angle between the two adjacent end faces is 110 degrees. In the longitudinal section direction of the guide cylinder, the three end faces are disposed at intervals. A first guide rail, a second guide rail, and a third guide rail are disposed on the three end faces, respectively, and are fixed through second bolts. A first slide seat, a second slide seat, and a third slide seat are disposed on the first guide rail, the second guide rail, and the third guide rail, respectively. The guide rail and the corresponding slide seat form a sliding pair. The first rack, the second rack, and the third rack are disposed on the first slide seat, the second slide seat, and the third slide seat, respectively, and fixed through third bolts. The movement of the three racks drives the three slide seats to move on the three guide rails, respectively.

The three sliding seats are provided with three square holes, respectively, which are in transit fit with the square clamping claws of the tire, and fixed with screws. Owing to the height difference between the first guide rail, the second guide rail and the third guide rail in the longitudinal direction, the same height difference exists in the square holes of the first slide seat, the second slide seat and the third slide seat, so that the three clamping claws have the same height difference in the longitudinal section direction. In the cross section direction, because the first rack, the second rack, and the third rack are driven by the gear, the stretching distances thereof are equal. This ensures that during the stretching of the first clamping claw, the second clamping claw and the third clamping claw, the center positions of the first clamping claw, the second clamping claw and the third clamping claw are unchanged in the cross section.

The reflector base is disposed on the upper part of the shaft support. The diameter of the lower part of the reflector base is the same as the diameter of the inscribed circle of the outer hexagon on the upper part of the shaft sleeve. The diameter of part of the lower part of the reflector base is close to that of the upper edge of the outer hexagon. A pressure spring is disposed around the outer hexagon. If necessary, the hexagonal wrench can be moved out of the outer hexagon and does not rotate with the shaft sleeve. At ordinary times, the hexagonal wrench can also be reset under the push of the pressure spring to restore the function of the wrench.

DETAILED DESCRIPTION

To further illustrate, embodiments detailing a tire centering fixture are described below. It should be noted that the following embodiments are intended to describe and not to limit the disclosure.

Figure 1B:
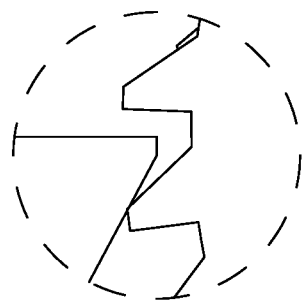
FIG. 1B is a local enlarged view of part I in FIG. 1A.
Figure 1A:
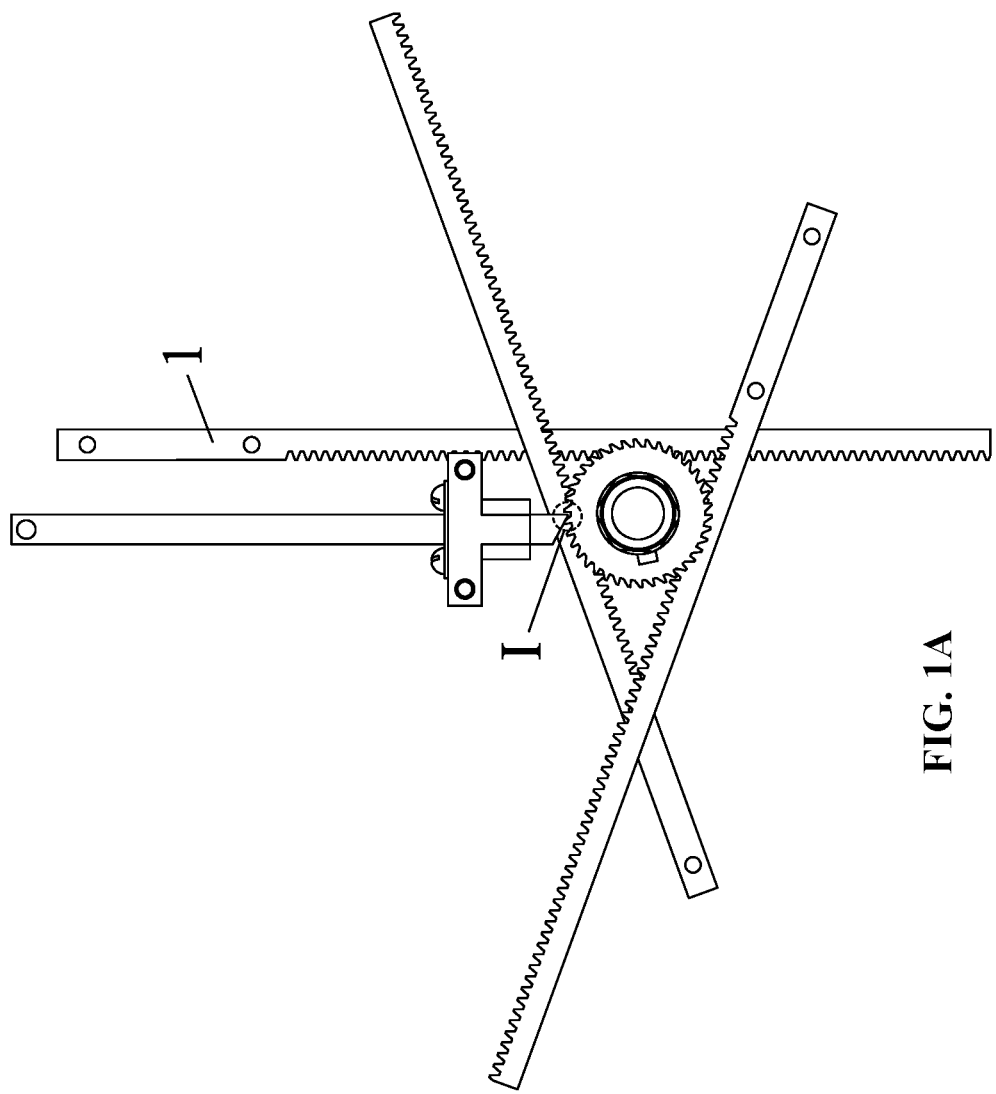
FIG. 1A is a front view of a tire centering fixture comprising a gear, three racks, and a self-locking mechanism according to one embodiment of the disclosure.
Figure 2:
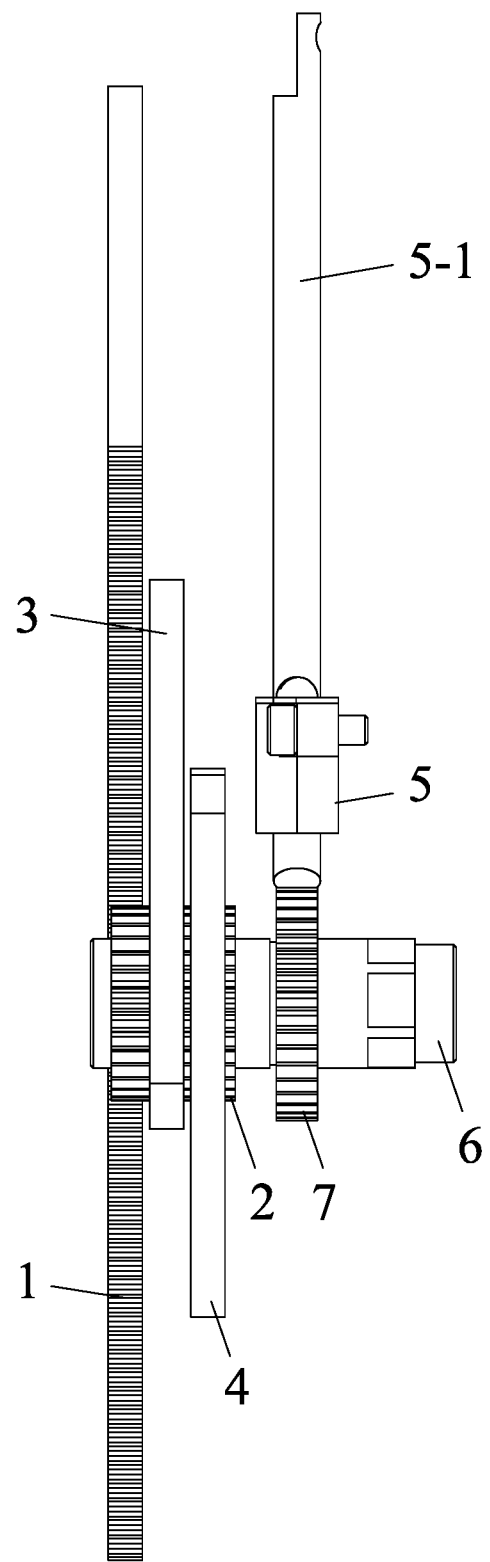
FIG. 2 is a side view of a tire centering fixture comprising a gear, three racks, and a self-locking mechanism according to one embodiment of the disclosure.
Figure 3:
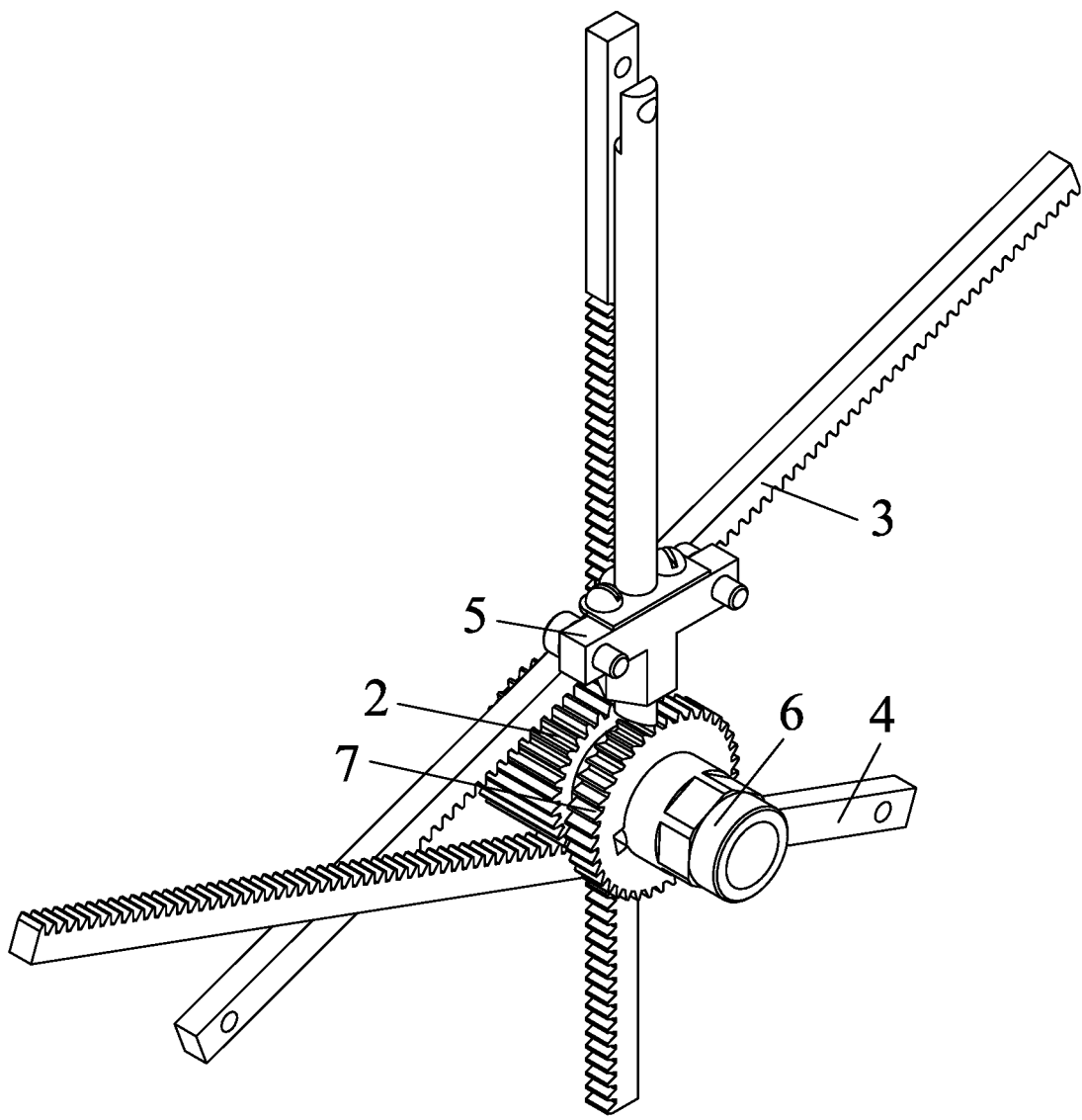
FIG. 3 is a three-dimensional view of a tire centering fixture comprising a gear, three racks, and a self-locking mechanism according to one embodiment of the disclosure.
Figure 4:
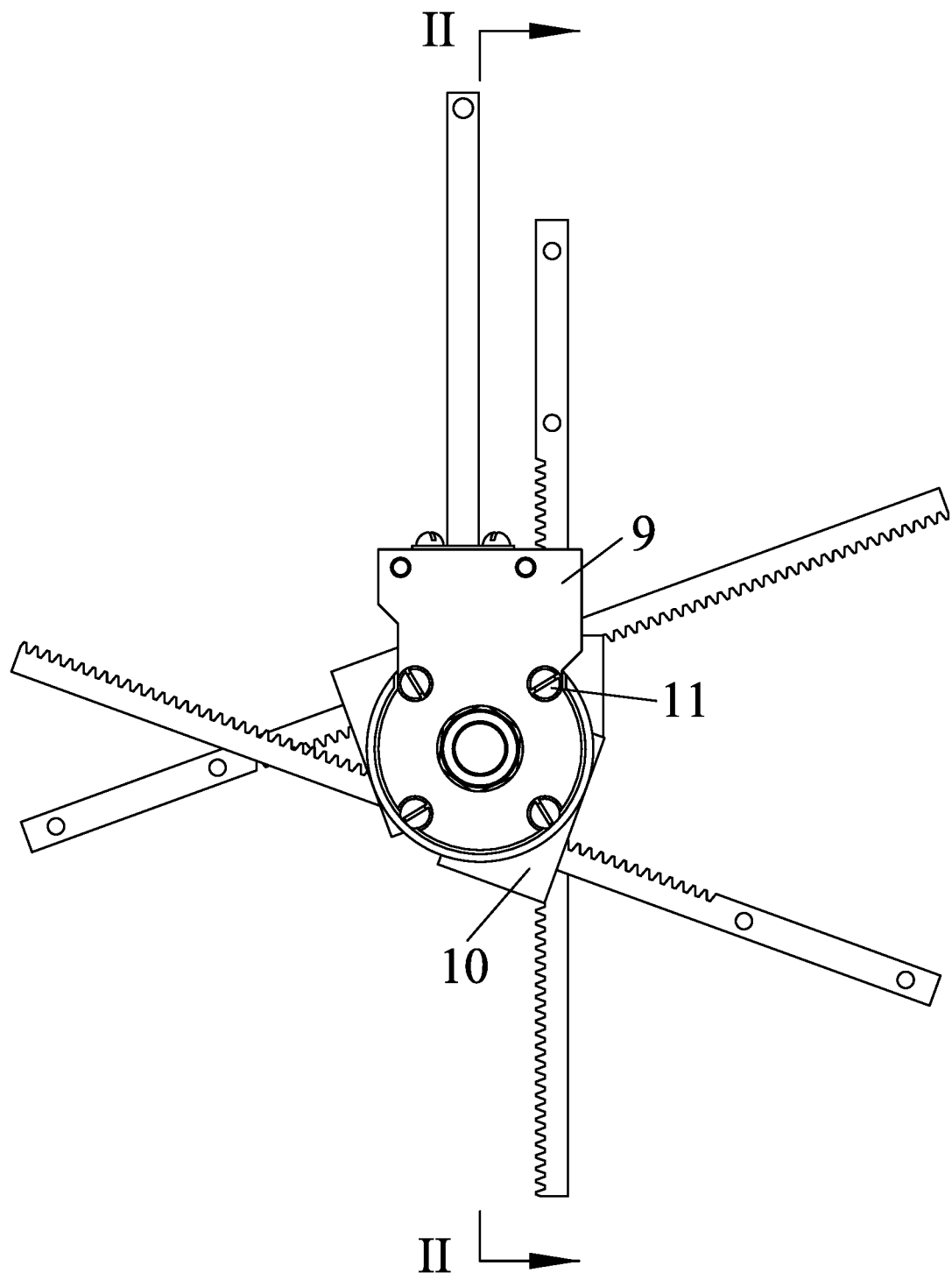
FIG. 4 is a front view of a locating base and guide rails of a tire centering fixture according to one embodiment of the disclosure.
Figure 5:
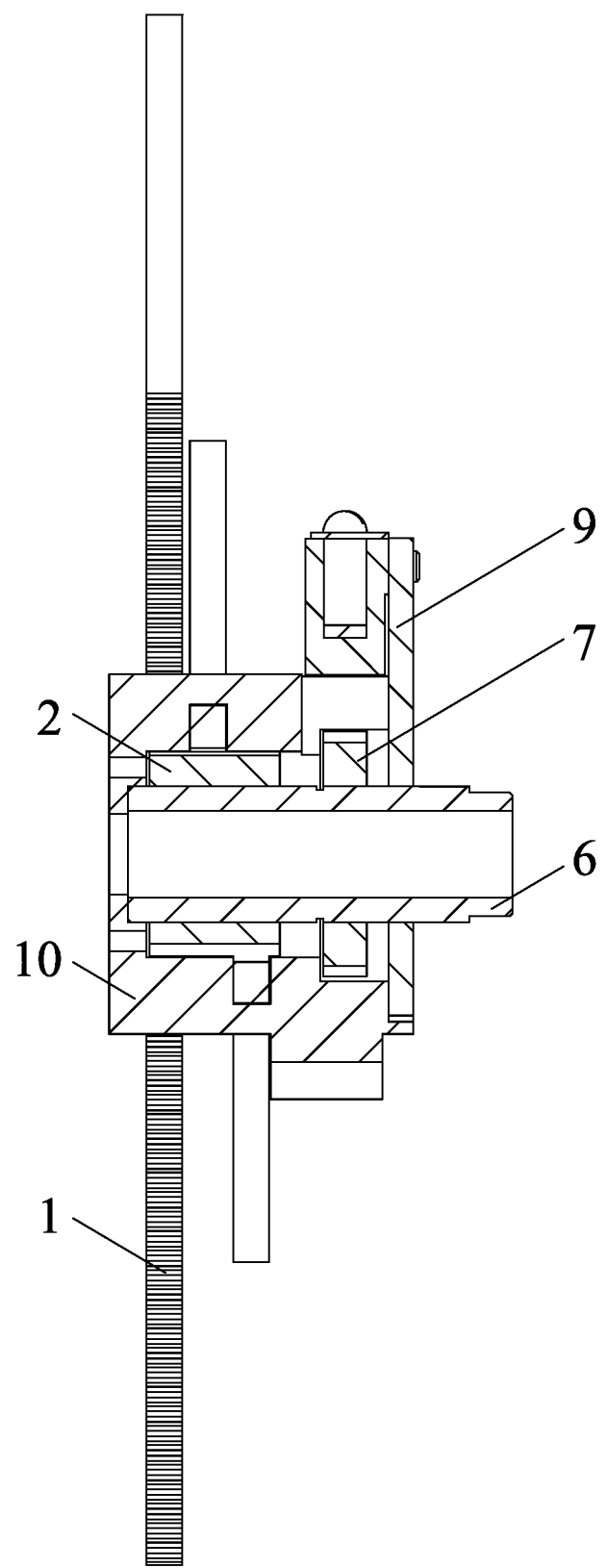
FIG. 5 is a sectional view taken from line II-II in FIG. 4.
Figure 6A:
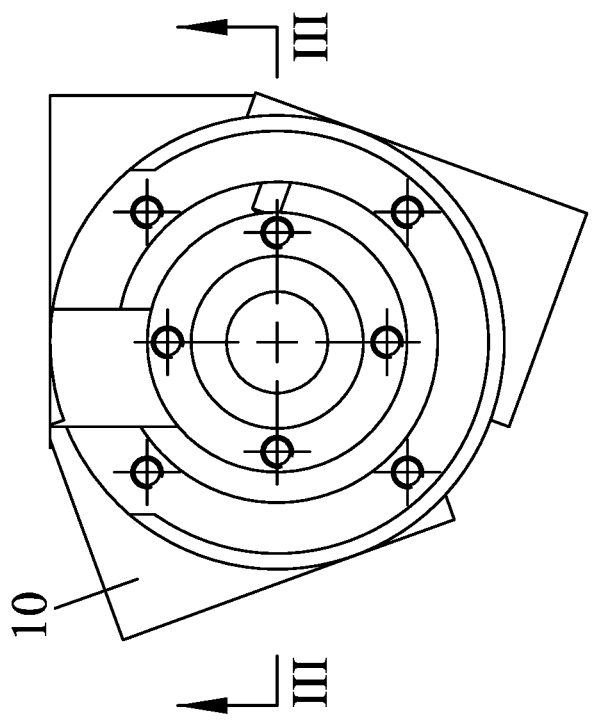
FIG. 6A is a schematic diagram of a guide cylinder of a tire centering fixture according to one embodiment of the disclosure.
Figure 6B:
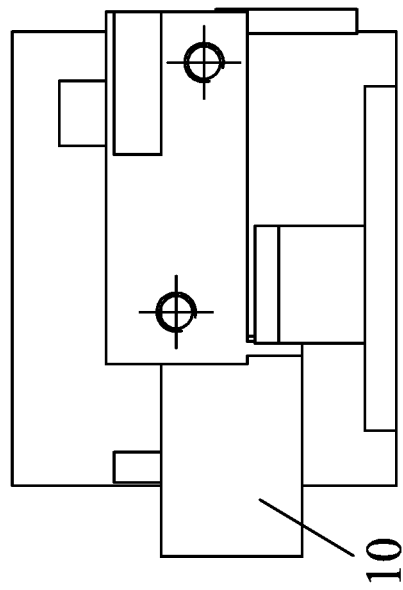
FIG. 6B is a side view of a guide cylinder of a tire centering fixture according to one embodiment of the disclosure.
Figure 6D:
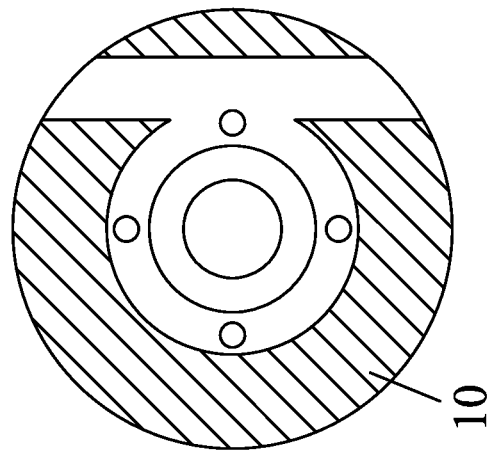
FIG. 6D is a sectional view taken from line IV-IV in FIG. 6C.
Figure 6C:
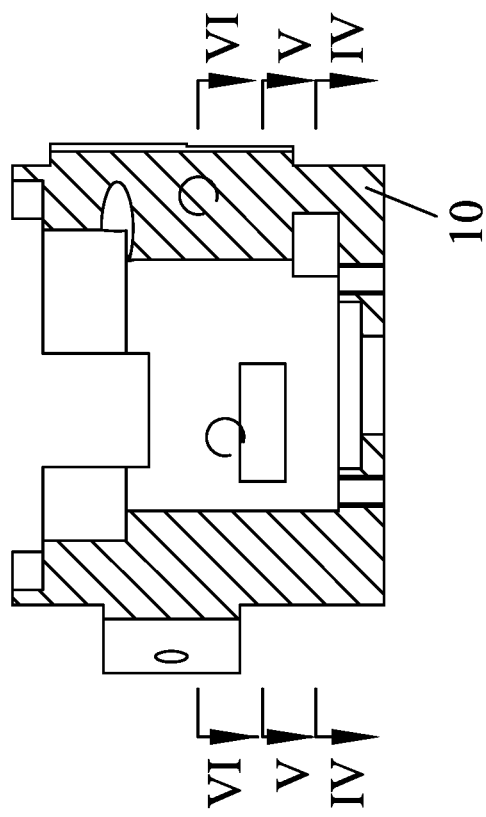
FIG. 6C is a sectional view taken from line in FIG. 6A.
Figure 6F:
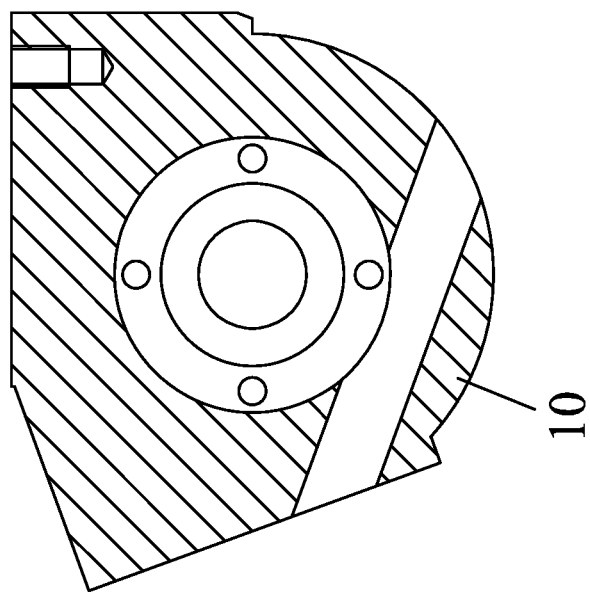
FIG. 6F is a sectional view taken from line VI-VI in FIG. 6C.
Figure 6E:
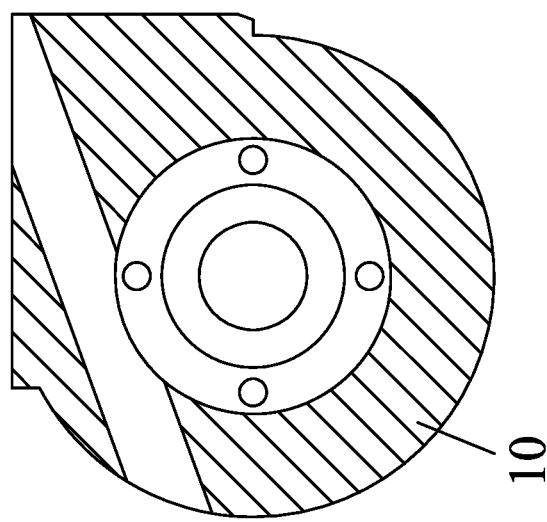
FIG. 6E is a sectional view taken from line V-V in FIG. 6C.
Figure 7C:
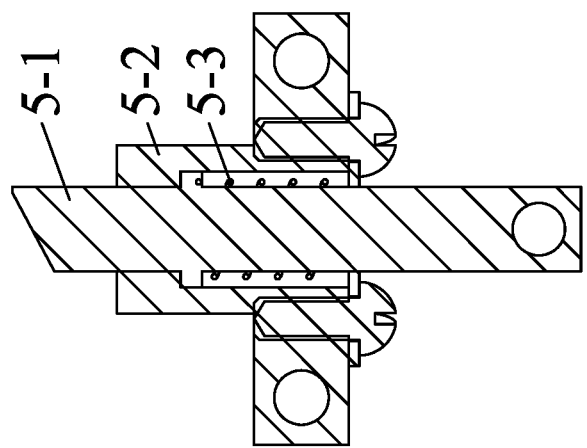
FIG. 7C is a sectional view taken from line VII-VII in FIG. 7A.
Figure 7B:
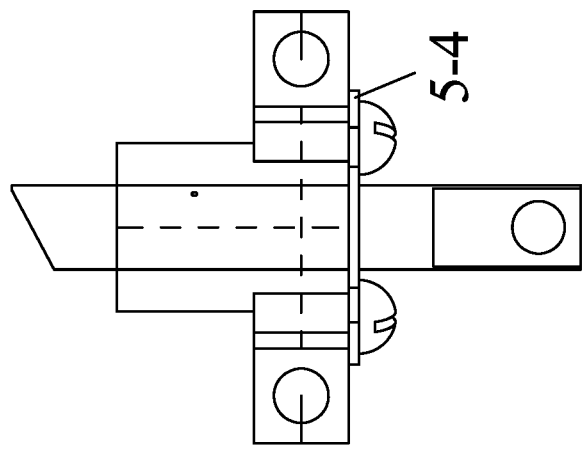
FIG. 7B is a side view of a locating mechanism of a tire centering fixture according to one embodiment of the disclosure.
Figure 7A:
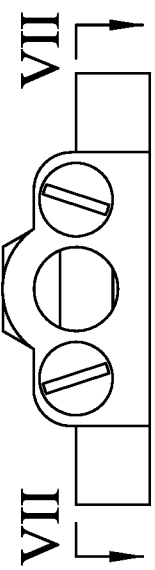
FIG. 7A is a schematic diagram of a locating mechanism of a tire centering fixture according to one embodiment of the disclosure.
Figure 8B:
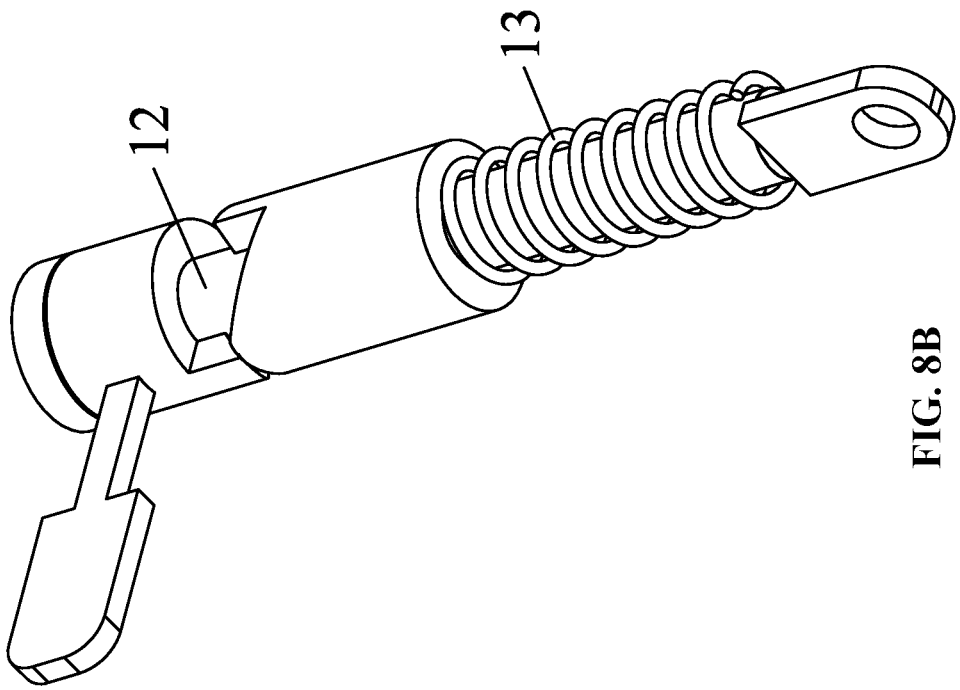
FIG. 8B is a schematic diagram of a pull rod of a tire centering fixture according to one embodiment of the disclosure in a clamping state.
Figure 8A:
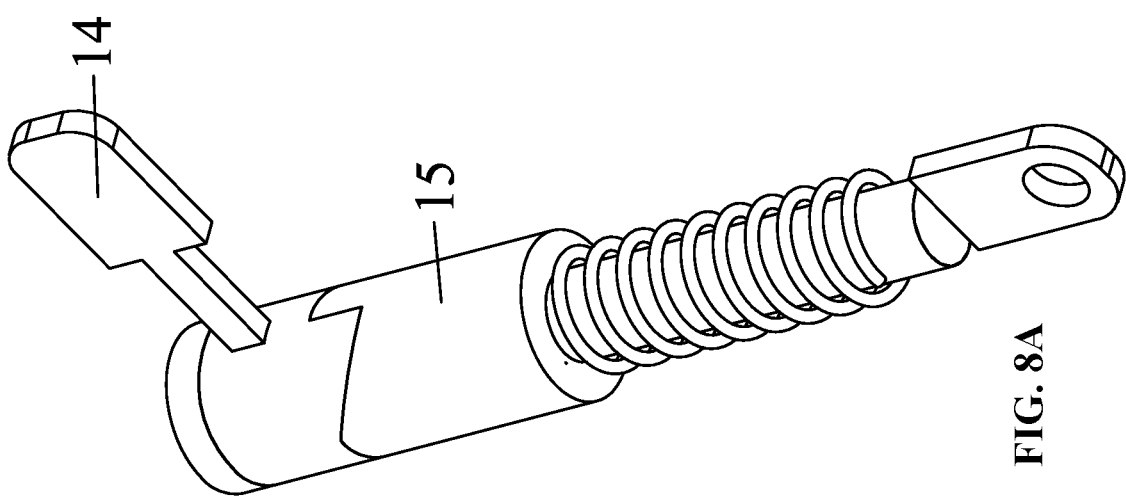
FIG. 8A is a schematic diagram of a pull rod of a tire centering fixture according to one embodiment of the disclosure in a release state.
Figure 9:
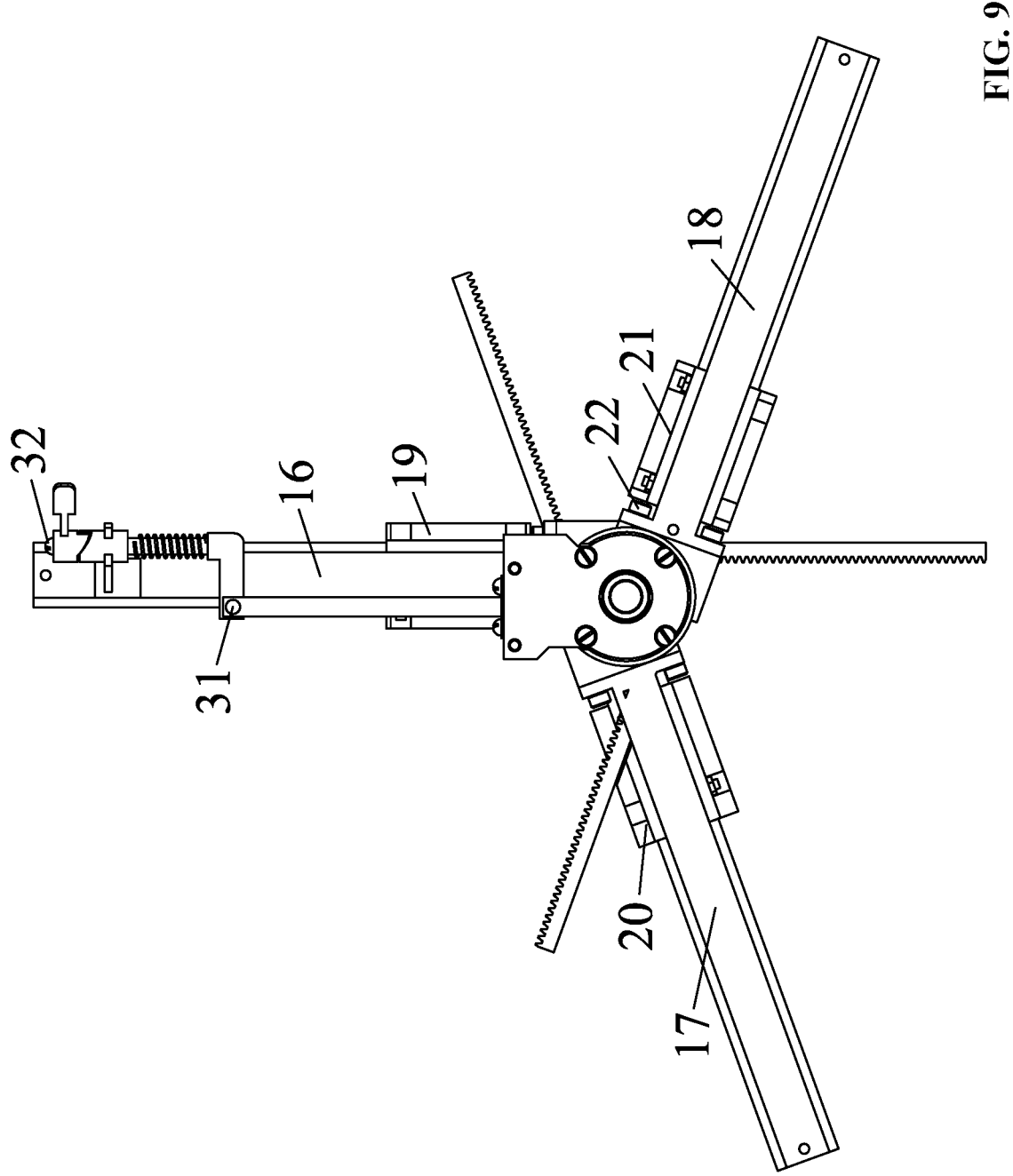
FIG. 9 is a front view of a tire centering fixture according to one embodiment of the disclosure.
Figure 10:
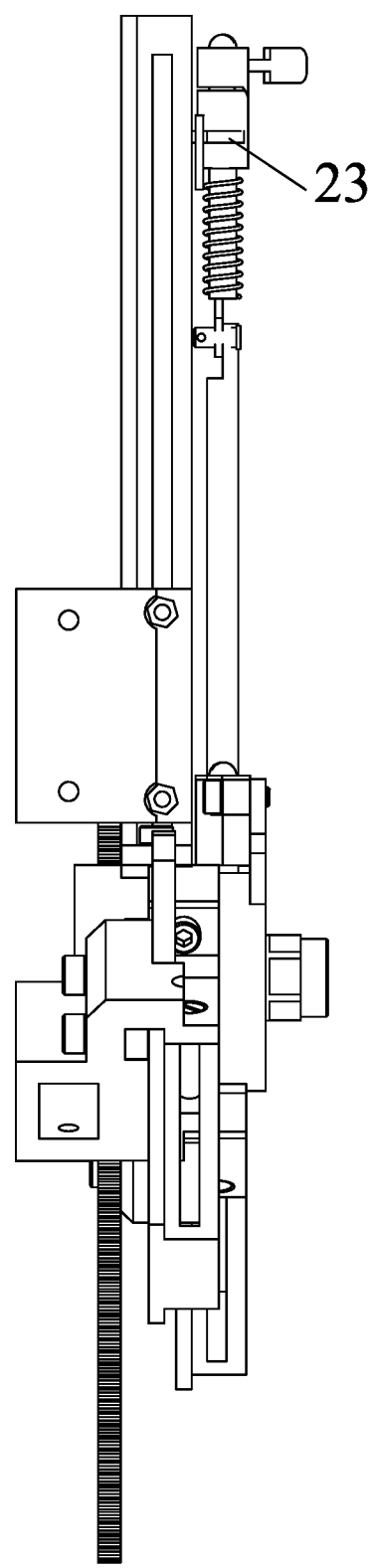
FIG. 10 is a side view of a tire centering fixture according to one embodiment of the disclosure.
Figure 11:
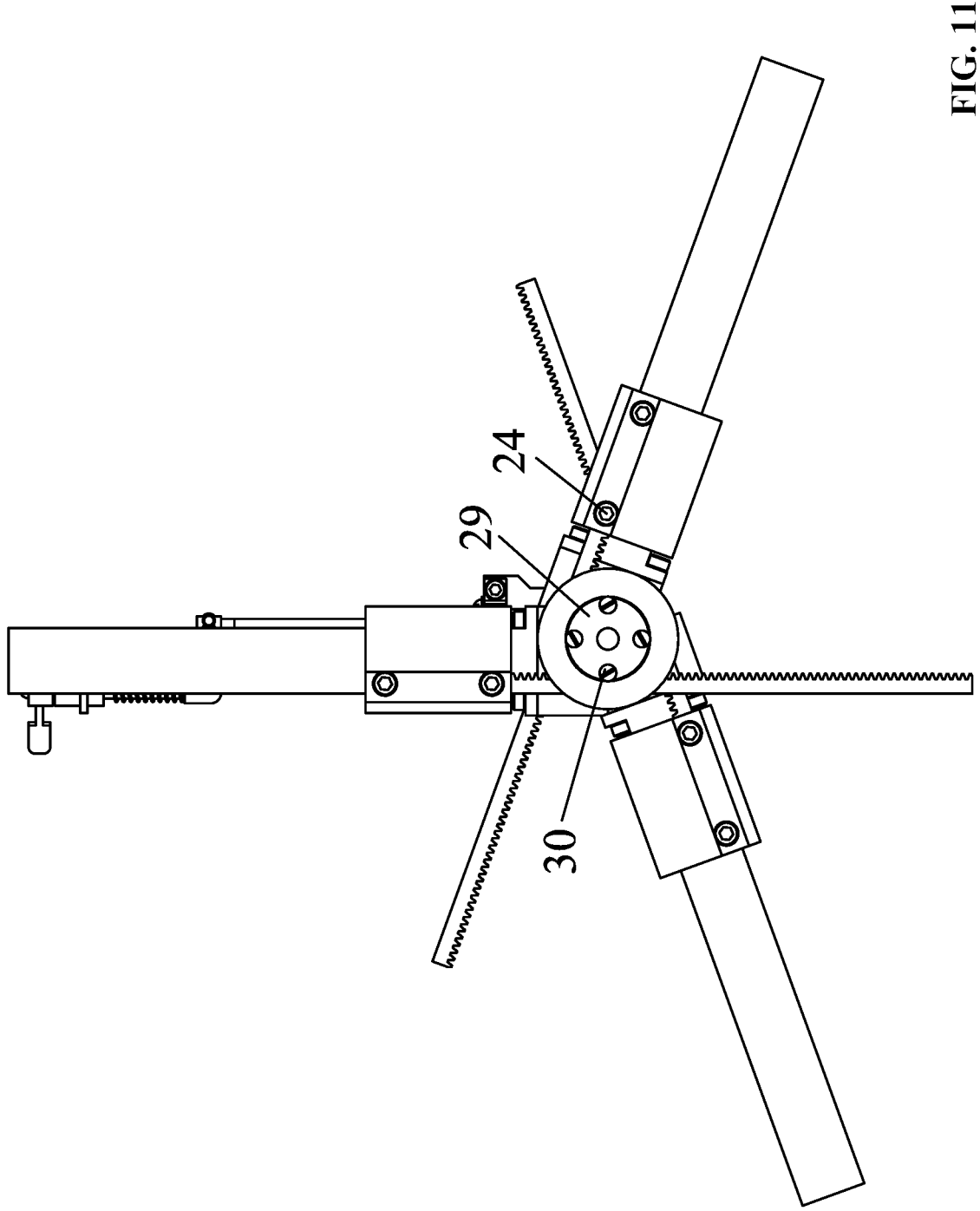
FIG. 11 is a back view of a tire centering fixture according to one embodiment of the disclosure.
Figure 12:
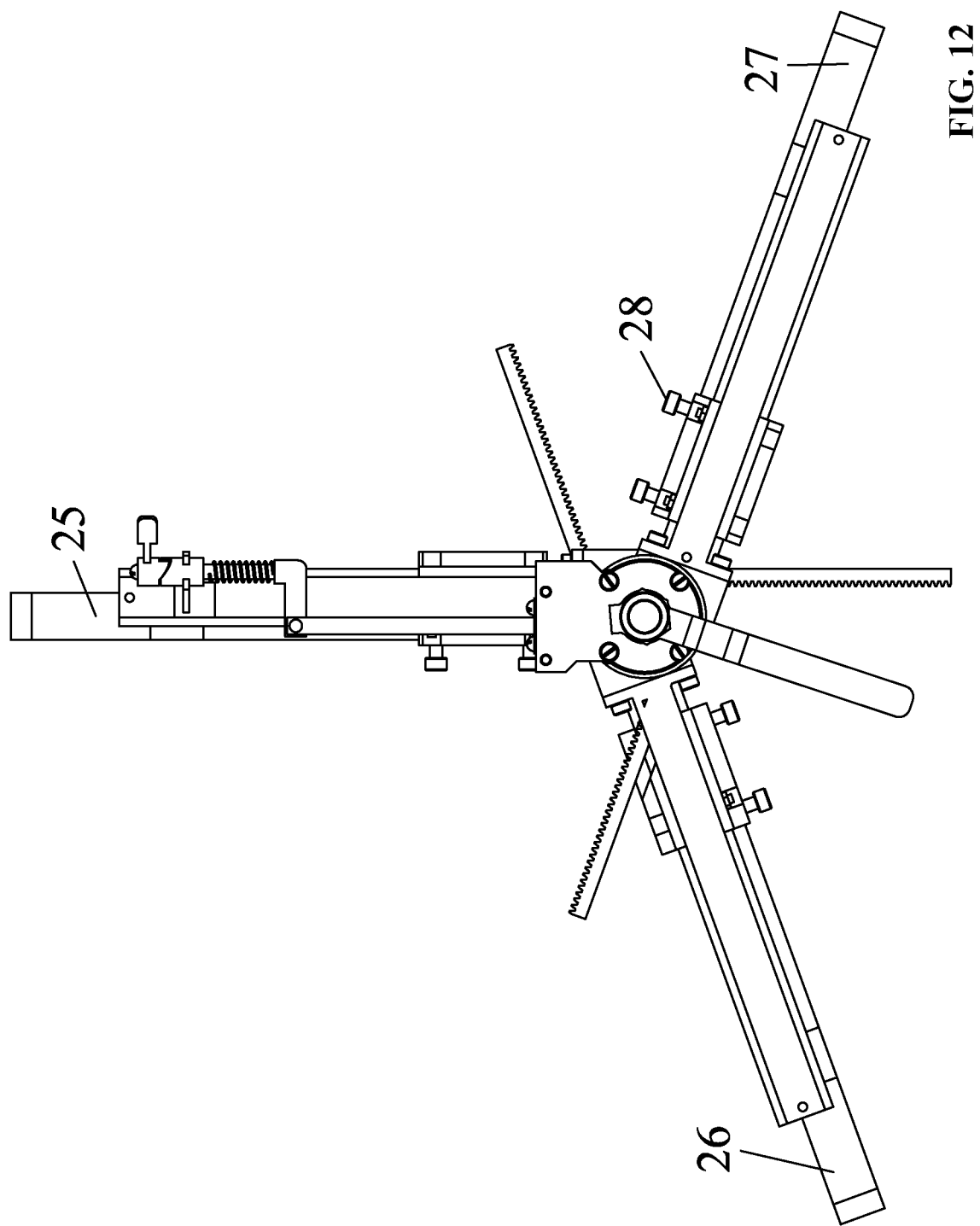
FIG. 12 is another front view of a tire centering fixture according to one embodiment of the disclosure.

As shown in FIGS. 1A-12, the disclosure provides a tire centering fixture comprising a gear 2, a first rack 1, a second rack 3, and a third rack 4. The first rack 1, the second rack 3, and the third rack 4 are engaged with the gear 2. The gear is disposed around a shaft sleeve 6. The gear 2 and the shaft sleeve 6 are disposed on a guide cylinder 10. The guide cylinder 10 comprises a central cavity and a base wall. The base wall comprises a central hole and a circular recess. The lower end of the shaft sleeve 6 is in movable fit with the circular recess of the base wall, and the lower end face thereof is flush with the bottom surface of the circular recess. A locating base 9 is disposed on the upper end face of the guide cylinder 10 and is fixed on the guide cylinder 10 via a first bolt 11. The locating base 9 functions as an end cover. The locating base 9 comprises a central through hole and the shaft sleeve 6 is rotatably disposed in the central through hole. The shaft sleeve 6 and the gear 2 are rotatable in the guide cylinder 2. The first rack 1, the second rack 3, and the third rack 4 are disposed through the peripheral wall of the guide cylinder 10. In the cross-section direction of the shaft sleeve, the included angle between every two adjacent racks is 110 degrees. Optionally, other degrees are also practicable. In the longitudinal section direction of the gear, the first rack 1, the second rack 3, and the third rack 4 are disposed at intervals. The peripheral wall of the guide cylinder 10 comprises three square through holes, and the first rack 1, the second rack 3, and the third rack 4 are disposed through the three square through holes, respectively. Each rack is movable in a corresponding square through hole, that is, the three square through holes are slide rails of the first rack 1, the second rack 3, and the third rack 4, respectively. The three square through holes are configured to ensure the engagement of the first rack 1, the second rack 3, and the third rack 4 with the gear 2 in the radial direction of the gear, with constant gaps therebetween, and to ensure a constant gap between each of the first rack 1, the second rack 3, and the third rack 4 and the gear 2 in the axial direction. The first rack 1, the second rack 3, and the third rack 4 moves along the tangential direction of the gear 2.

To keep the relative position of the gear and the first rack 1, the second rack 3, and the third rack 4 in the static state, the tire centering fixture is equipped with a self-locking mechanism and a concave-convex wheel mechanism. The shaft sleeve 6 is equipped with a ratchet 7. The self-locking mechanism is configured to fix the ratchet 7. The locating base 9 is provided with a locating mechanism 5. The locating mechanism 5 comprises a shell 5-2, a pin rod 5-1, a reset spring 5-3, and a rear cover 5-4. The pin rod 5-1 is configured to lock the ratchet 7. The gear 2 and the ratchet 7 are fixed on the shaft sleeve 6, when the ratchet 7 is locked, so is the gear 2. The locating mechanism 5 comprises the reset spring 5-3, and in the free state, the pin rod 5-1 is in an extended state. The front end of the pin rod 5-1 comprises an inclined plane, which is configured to limit the ratchet 7 to rotate one way. That is, when the first clamping claw 25, the second clamping claw 26, and the third clamping claw 27 move to tighten the tire, the ratchet 7 is rotatable; when the first clamping claw 25, the second clamping claw 26, and the third clamping claw 27 move to loosen the tire, the ratchet 7 is stuck by the pin rod 5-1 and not rotatable. To make the ratchet 7 rotate reversely, the pin rod 5-1 must retract out of the stuck state. The self-locking mechanism of the ratchet can also be used in other fixtures.

To control the stretching and contraction of the pin rod 5-1, the tire centering fixture is equipped with a cylindrical lifting mechanism. The cylindrical lifting mechanism comprises a pull rod 12, a cylindrical convex cam 14, and a cylindrical concave cam 15. The pull rod 12 is connected to the pin rod 5-1. The cylindrical convex cam 14 and the cylindrical concave cam 15 are disposed around the pull rod 12. The cylindrical concave cam 15 comprises a concave slope having a few of rotating angles, and the cylindrical convex cam 14 comprises a convex slope corresponding to the concave slope. The cylindrical convex cam 14 is fixed in a support base 23. When the cylindrical convex cam 14 rotates with the pull rod 12 as the axis along the concave slope of the concave cam, an axial displacement occurs to the cylindrical convex cam 14, thus driving the pull rod 12 and the bolt cap 34 to move axially. A spring 13 is disposed between one end of the cylindrical concave cam 15 and the step of the pull rod 12. When the cylindrical convex cam 14 rotates in the opposite direction, the cylindrical convex cam 14 returns axially under the action of the spring 13. The outer circumference of the cylindrical convex cam 14 is welded with a wrench. Optionally, the cylindrical lifting mechanism is a ball point pen type telescopic mechanism or the left and right limit position of the wrench plus the tension spring.

The pull rod 12 is connected to the pin rod 5-1 via a hinge pin. A round hole is disposed at the lower end of the pull rod 12, and the hinge pin on the pin rod 5-1 is disposed in the round hole. The length of the pull rod 12 ensures the cylindrical convex cam 14 and the cylindrical concave cam 15 move to the vicinity of the handle.

The center of the tire centering fixture comprises a shaft support 30 for receiving a reflector base. The shaft support is in transition fit with the center hole of the bottom end of the guide cylinder 10, and the bottom plate of the shaft support is matched with the bottom surface of the guide cylinder and fixed with the screw 30. The shaft support 30 passes through the middle of the shaft sleeve 6 and is concentric with the shaft sleeve 6 with clearance fit, so that the rotation of the shaft sleeve 6 does not affect the shaft support 30.

The upper end of the shaft sleeve 6 is in the shape of a regular hexagon, which is dynamically matched with the hexagon wrench. The hexagon wrench rotates to drive the shaft sleeve 6 and the gear 2, so that the first rack 1, the second rack 3, and the third rack 4 which are engaged with the gear 2 move synchronously.

The guide cylinder 10 comprises three end faces. In the cross-section direction of the guide cylinder 10, the included angle between the two adjacent end faces is 110 degrees. In the longitudinal section direction of the guide cylinder 10, the three end faces are disposed at intervals. A first guide rail 16, a second guide rail 17, and a third guide rail 18 are disposed on the three end faces, respectively, and are fixed through second bolts 22. A first slide seat 19, a second slide seat 20, and a third slide seat 21 are disposed on the first guide rail 16, the second guide rail 17, and the third guide rail 18, respectively. The guide rail and the corresponding slide seat form a sliding pair. The first rack 1, the second rack 3, and the third rack 4 are disposed on the first slide seat 19, the second slide seat 20, and the third slide seat 21, respectively, and fixed through third bolts 24. The movement of the three racks drives the three slide seats to move on the three guide rails, respectively. In certain embodiments, the first guide rail 16, the second guide rail 17, and the third guide rail 18 are integrated with the guide cylinder 10.

The three sliding seats are provided with three square holes, respectively, which are in transit fit with the square clamping claws 25, 26 and 27 of the tire, and fixed with screws 28. Owing to the height difference between the first guide rail 16, the second guide rail 17 and the third guide rail 18 in the longitudinal direction, the same height difference exists in the square holes of the first slide seat 19, the second slide seat 20 and the third slide seat 21, so that the three clamping claws 25, 26 and 27 have the same height difference in the longitudinal section direction. In the cross section direction, because the first rack 1, the second rack 3, and the third rack 4 are driven by the gear 2, the stretching distances thereof are equal. This ensures that during the stretching of the first clamping claw 25, the second clamping claw 26 and the third clamping claw 27, the center positions of the first clamping claw 25, the second clamping claw 26 and the third clamping claw 27 are unchanged in the cross section.

The reflector base 29 is disposed on the upper part of the shaft support 30. The diameter of the lower part of the reflector base 29 is the same as the diameter of the inscribed circle of the outer hexagon on the upper part of the shaft sleeve 6. The diameter of part of the lower part of the reflector base 29 is close to that of the upper edge of the outer hexagon. A pressure spring is disposed around the outer hexagon. If necessary, the hexagonal wrench 8 can be moved out of the outer hexagon and does not rotate with the shaft sleeve 6. At ordinary times, the hexagonal wrench 8 can also be reset under the push of the pressure spring to restore the function of the wrench.

It will be obvious to those skilled in the art that changes and modifications may be made, and therefore, the aim in the appended claims is to cover all such changes and modifications.

What is claimed is:
1. A tire centering fixture, comprising:
a gear;
a first rack;
a second rack;
a third rack;
a shaft sleeve; and
a guide cylinder;
wherein:
the first rack, the second rack, and the third rack are engaged with the gear;

the gear is disposed around the shaft sleeve; the gear and the shaft sleeve are disposed on the guide cylinder; the guide cylinder comprises a central cavity and a base wall; the base wall comprises a central hole and a circular recess; a lower end of the shaft sleeve is in movable fit with the circular recess of the base wall, and a lower end face thereof is flush with a bottom surface of the circular recess; a locating base is disposed on an upper end face of the guide cylinder and is fixed on the guide cylinder; the locating base functions as an end cover; the locating base comprises a central through hole and the shaft sleeve is rotatably disposed in the central through hole; the shaft sleeve and the gear are rotatable in the guide cylinder; in a cross-section direction of the shaft sleeve, an included angle between every two adjacent racks is 110 degrees; in a longitudinal section direction of the gear, the first rack, the second rack, and the third rack are disposed at intervals; a peripheral wall of the guide cylinder comprises three square through holes, and the first rack, the second rack, and the third rack are disposed through the three square through holes, respectively; each rack is movable in a corresponding square through hole; the three square through holes are slide rails of the first rack, the second rack, and the third rack, respectively; the three square through holes are configured to ensure the engagement of the first rack, the second rack, and the third rack with the gear in a radial direction of the gear, with constant gaps therebetween, and to ensure a constant gap between each of the first rack, the second rack, and the third rack and the gear in an axial direction; the first rack, the second rack, and the third rack are movable along a tangential direction of the gear; and an upper end of the shaft sleeve is in the shape of a regular hexagon, which is dynamically matched with a hexagon wrench; when in use, the hexagon wrench rotates to drive the shaft sleeve and the gear, so that the first rack, the second rack, and the third rack which are engaged with the gear move synchronously.

2. The tire centering fixture of claim 1, wherein the tire centering fixture further comprises a self-locking mechanism; the shaft sleeve is equipped with a ratchet; the self-locking mechanism is configured to fix the ratchet; the locating base is provided with a locating mechanism; the locating mechanism comprises a shell, a pin rod, a reset spring, and a rear cover; the pin rod is configured to lock the ratchet; the gear and the ratchet are fixed on the shaft sleeve, when the ratchet is locked, so is the gear; the locating mechanism comprises the reset spring, and in a free state, the pin rod is in an extended state; a front end of the pin rod comprises an inclined plane, which is configured to limit the ratchet to rotate one way; when in use, when a first clamping claw, a second clamping claw, and a third clamping claw move to tighten a tire, the ratchet is rotatable; when the first clamping claw, the second clamping claw, and the third clamping claw move to loosen the tire, the ratchet is stuck by the pin rod and not rotatable; to rotate the ratchet reversely, the pin rod must retract out of a stuck state.

3. The tire centering fixture of claim 1, wherein the tire centering fixture comprises a cylindrical lifting mechanism; the cylindrical lifting mechanism comprises a pull rod, a cylindrical convex cam, and a cylindrical concave cam; the pull rod is connected to the pin rod; the cylindrical convex cam and the cylindrical concave cam are disposed around the pull rod; the cylindrical concave cam comprises a concave slope having rotating angles, and the cylindrical convex cam comprises a convex slope corresponding to the concave slope; the cylindrical convex cam is fixed in a support base; when the cylindrical convex cam rotates with the pull rod as the axis along the concave slope of the concave cam, an axial displacement occurs to the cylindrical convex cam, thus driving the pull rod and a bolt cap to move axially; a spring is disposed between one end of the cylindrical concave cam and a step of the pull rod; when the cylindrical convex cam rotates in an opposite direction, the cylindrical convex cam returns axially under the action of the spring; an outer circumference of the cylindrical convex cam is welded with a wrench; optionally, the cylindrical lifting mechanism is a ball point pen type telescopic mechanism or the left and right limit position of the wrench plus the tension spring.

4. The tire centering fixture of claim 1, wherein the guide cylinder comprises three end faces; in a cross-section direction of the guide cylinder, an included angle between the two adjacent end faces is 110 degrees; in a longitudinal section direction of the guide cylinder, the three end faces are disposed at intervals; a first guide rail, a second guide rail, and a third guide rail are disposed on the three end faces, respectively, and are fixed through second bolts; a first slide seat, a second slide seat, and a third slide seat are disposed on the first guide rail, the second guide rail, and the third guide rail, respectively; each guide rail and a corresponding slide seat form a sliding pair; the first rack, the second rack, and the third rack are disposed on the first slide seat, the second slide seat, and the third slide seat, respectively, and fixed through third bolts; the movement of the three racks drives the first slide seat, the second slide seat, and the third slide seat to move on the three guide rails, respectively; the three sliding seats are provided with three square holes, respectively, which are in transit fit with square clamping claws, and of the tire, and fixed with screws; owing to a height difference between the first guide rail, the second guide rail and the third guide rail in the longitudinal direction, the same height difference exists in the square holes of the first slide seat, the second slide seat and the third slide seat, so that the first clamping claw, the second clamping claw, and the third clamping claw have the same height difference in the longitudinal section direction; in the cross section direction, because the first rack, the second rack, and the third rack are driven by the gear, stretching distances thereof are equal, which ensures that during the stretching of the first clamping claw, the second clamping claw and the third clamping claw, center positions of the first clamping claw, the second clamping claw and the third clamping claw are unchanged in the cross section; and the first guide rail, the second guide rail, and the third guide rail are integrated with the guide cylinder.

5. The tire centering fixture of claim 1, wherein the center of the tire centering fixture comprises a shaft support for receiving a reflector base; the shaft support is in transition fit with a center hole on a bottom end of the guide cylinder, and a bottom plate of the shaft support is matched with a bottom surface of the guide cylinder and fixed with the screw; the shaft support passes through a middle of the shaft sleeve and is concentric with the shaft sleeve with clearance fit, so that the rotation of the shaft sleeve does not affect the shaft support; the reflector base is disposed on an upper part of the shaft support; a diameter of a lower part of the reflector base is the same as a diameter of an inscribed circle of an outer hexagon on an upper part of the shaft sleeve; the diameter of part of the lower part of the reflector base is close to that of an upper edge of the outer hexagon; a pressure spring is disposed around the outer hexagon; if necessary, the hexagonal wrench is moved out of the outer hexagon and does not rotate with the shaft sleeve; at ordinary times, the hexagonal wrench is reset under the push of the pressure spring to restore the function of the wrench.

\* \* \* \* \*